(12) United States Patent
Tayal et al.

(10) Patent No.: US 12,399,852 B2
(45) Date of Patent: Aug. 26, 2025

(54) CREATE AND OPTIMIZE DYNAMIC DATA ADAPTATION LAYER IN EDGE COMPUTING

(71) Applicant: International Business Machines Corporation, Armonk, NY (US)

(72) Inventors: Sagar Tayal, Ambala (IN); Christian van Maastricht, Rosmalen (NL); David Jason Hunt, Kirkwood, MO (US); Alecio Pedro Delazari Binotto, Munich (DE); Maja Curic, Munich (DE)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 18/121,104

(22) Filed: Mar. 14, 2023

(65) Prior Publication Data
US 2024/0273046 A1    Aug. 15, 2024

(30) Foreign Application Priority Data
Feb. 15, 2023   (GB) ..................... 2302126

(51) Int. Cl.
  *G06F 13/14*   (2006.01)
  *G06F 13/12*   (2006.01)
  *G06F 13/38*   (2006.01)

(52) U.S. Cl.
  CPC .......... *G06F 13/387* (2013.01); *G06F 13/128* (2013.01)

(58) Field of Classification Search
  CPC .... G06F 13/387; G06F 13/128; G06F 16/258; G06F 2213/3852; H04L 69/08; H04L 69/24
  See application file for complete search history.

(56) References Cited

U.S. PATENT DOCUMENTS 7,464,204 B2 *  12/2008  Isobe .................. G06F 3/067
                                                  710/8
9,690,731 B2    6/2017   Sadeghi
(Continued)

OTHER PUBLICATIONS

Venero Ferro et al., "An Architecture for Dynamic Self-Adaptation in Workflows", Int'l Conf. Software Eng. Research and Practice | SERP'15 | Conference Paper—Jul. 2015, 8 pages.
(Continued)

*Primary Examiner* — Henry Tsai
*Assistant Examiner* — Kim T Huynh
(74) *Attorney, Agent, or Firm* — Aaron N. Pontikos

(57) ABSTRACT

A computer-implemented method for creating a data transformation adapter for non-standardized data between a data producer unit and a data consumer unit in a data communication environment is disclosed. The method comprises analyzing first data specifications of the data producer unit, and analyzing second data specifications related to the data consumer unit. The method also comprises matching data attributes of the first specifications with data attributes of the second specifications, generating dynamically a plurality of data transformation adapters using the matched data attributes, selecting a verified adapter ensuring that the matched data attributes of the first specifications and the data attributes of the second specifications are transformed correctly, and generating a minimal data transformation child adapter from the verified adapter based on current dynamic performance requirements of a data consumer, and data attributes currently used by an application of the data consumer unit.

19 Claims, 10 Drawing Sheets

(56) References Cited

U.S. PATENT DOCUMENTS

| | | | |
|---|---|---|---|
| 2003/0145074 A1* | 7/2003 | Penick | H04L 63/0846 |
| | | | 709/223 |
| 2017/0075833 A1* | 3/2017 | Kuruvila | G06F 13/4068 |
| 2021/0400537 A1* | 12/2021 | Zhang | H04L 47/28 |
| 2022/0183003 A1 | 6/2022 | Wei | |

OTHER PUBLICATIONS

GB Application No. 2302126.4, filed Feb. 15, 2023, 51 pps.

\* cited by examiner

CREATE AND OPTIMIZE DYNAMIC DATA ADAPTATION LAYER IN EDGE COMPUTING

BACKGROUND OF THE INVENTION

The invention relates generally to a data transformation adapter for non-standardized data in a data communication environment, and more specifically, to a computer-implemented method for creating a data transformation adapter for non-standardized data between a data producer unit and a data consumer unit in a data communication environment. The invention relates further to a related dynamic data adapter generator system for creating a data transformation adapter in a data communication environment, and a computer program product.

Transforming data relating to one metadata system into data relating to another metadata system has always been a sophisticated task of IT (information technology). For heterogeneous computing environments and application landscapes, transforming data of one application to related data of another application remains a challenging and time-consuming task for enterprise IT specialists. However, the more complex the application landscapes grow, the more complex the task of data transformation becomes. The past few decades, middleware has been developed in order to address the above-mentioned problem, at least in part, using publish-and-subscribe technologies. For comparability static enterprise IT environments, this technique is fairly stable in jobs that also address analytics workloads.

On the other side, this technique may also be used for real-time environments with comparably slowly changing conditions. However, if the involved data types and amounts of data may become very dynamic in nature—e.g., in modern telecommunication environments, like 4G, 5G, 6G and beyond—transforming data which have not been standardized through the above-mentioned telecommunication standouts may become a bottleneck. Such scenarios are becoming more common in cases, where non-standardized data may need to be transformed from one telecommunication equipment vendor's environment to another one's. Transforming too much data which may be irrelevant for a certain use case may reduce the overall performance in the same way as choosing a wrong or non-optimized transformation adapter.

Such a technical scenario of data communication environments with heterogeneous data may be described as having data producers and data consumers from various vendors. Here, an adaptation layer may be needed to enable data consumers from one vendor to leverage data from a data producer from a different vendor. In modern telecommunication networks, data producers and data consumers—i.e., associated front-end and back—and applications—may be very dynamic and delay requirements are comparatively strict, resulting in requirements for adaptation with the lowest delay impacting adaptation that uses resources efficiently. However, adaptation layers in disaggregated dynamic environments with heterogeneous data are currently considered to be static, i.e., in contrast to the requirements.

There are some disclosures related to a computer-implemented method for creating a data transformation adapter for non-standardized data between a data producer unit and a data consumer unit in a data communication environment. Document US 2021/0400537 A1 disclose multi-access management services (MAMS), which is a program of the framework that provides mechanisms for the flexible selection of network path in a multi-access (makes) communication environment, based on applications needs.

Additionally, document U.S. Pat. No. 9,690,731 B2 discloses systems and methods of transitioning a device to a default state. For example, an apparatus may include a first protocol adaption layer (PAL) communication unit to communicate PAL traffic with a second PAL communication unit over a communication link.

Thus, none of the known technologies may allow a freely and dynamically variable adaptation between requirements of different data producers and data consumers and telecommunication networks.

SUMMARY OF THE INVENTION

According to one aspect of the present invention, a computer-implemented method for creating a data transformation adapter for non-standardized data between a data producer unit and a data consumer unit in a data communication environment may be provided. The method may comprise analyzing first specifications related to data used by the data producer unit, and analyzing second specifications related to data used by the data consumer unit, wherein the first specifications and the second specifications are different from each other.

The method may also comprise matching data attributes of the first specifications with data attributes of the second specifications, generating dynamically a plurality of data transformation adapters using the matched data attributes, and electing a verified adapter ensuring that matched data attributes of the first specification and the data attributes of the second specifications are transformed correctly.

The method may also comprise generating a minimal data transformation child adapter from the verified adapter based on current dynamic performance requirements of a data consumer, and data attributes currently used by an application of the data consumer unit.

According to another aspect of the present invention, a dynamic data adapter generator system for creating a data transformation adapter for non-standardized data between a data producer unit and a data consumer unit in a data communication environment may be provided.

The dynamic data adapter generator system comprises one or more processors and a memory operatively coupled to the one or more processors, wherein the memory stores program code portions which, when executed by said one or more processors, enable the one or more processors to analyze first specifications related to data used by the data producer unit, analyze second specifications relating to data used by the data consumer unit, wherein the first specifications and the second specifications are different from each other, and to match data attributes of the first specifications with data attributes of the second specifications.

Furthermore, the processor may be enabled to dynamically generate a plurality of data transformation adapters using the matched data attributes, select a verified adapter ensuring that matched data attributes of the first specification and the data attributes of the second specifications are transformed correctly, and generate a minimal data transformation child adapter from the verified adapter based on current dynamic performance requirements of a data consumer, and data attributes currently used by an application of the data consumer unit.

The proposed computer-implemented method for creating a data transformation adapter for non-standardized data between a data producer unit and a data consumer unit in a data communication environment may offer multiple advantages, technical effects, contributions and/or improvements:

The proposed solution addresses the problem of data incompatibilities of non-standardized data fields of distributed applications in modern heterogeneous mobile telecommunication networks. Similar problems in comparable distributed computing environments, such as dynamic cloud computing environments, may also be addressed with the proposed concept.

Dynamically building, selecting and adapting data transformation adapters and/or by deriving a dynamic minimum data transformation child adapter from a before and created generated data transformation adapter may enable a self-adapting adaptation layer between data provider, i.e., data producer units and data consumers, i.e., data consumer units, especially for fast-changing mobile telecommunication networks.

The data field incompatibilities originate from vendor specific data fields in modern telecommunication standouts like 5G, 6G and beyond. If a data consumer unit uses the non-standardized data fields according to the second specifications as the data producer unit, no data transformation may normally be required. An exception to this rule is that the data fields used are defined according to different versions of the specification. If the provider of the applications used does not keep its data field specification upwards compatible, data transformation may be necessary in this case if applications are used that correspond to different versions of the specifications. Also these scenarios may be addressed with the concept proposed here.

The concept of implementing the dynamic minimum data transformation child adapter may also allow to save computing and network resources, because the capability of the data transformation adapter may dynamically be adapted to the available infrastructure availability and application requirements. Through a permanent redetermination of the available resources and requirements, it becomes possible to switch from one dynamic minimum data transformation child adapter to another one which may provide, e.g., higher throughput.

The proposed concept goes clearly beyond the classical enterprise application systems which allows to transform data according to a metadata definitions from the context of one application to another application, e.g. from an ERP system (enterprise resource planning) to a CRM system (customer relationship management) and vice versa. In comparison to modern telecommunication network requirements, the just described scenario has a much more static character, while the highly dynamically adaptable data transformation adapters are not required.

Hence, the newly proposed concept may be well tailored for modern IoT (Internet of Things) applications, real-time traffic control, robot applications and other applications of variable high-speed data exchange types.

In the following, additional embodiments of the inventive concept—applicable for the method as well as for the system—will be described.

According to a useful embodiment of the method, the analyzing the first specifications and the analyzing the second specifications may comprise assigning labels to identified data attributes. Thereby, the same label values may be used for both specifications if it may be concluded that equivalent data fields may have been identified. The identification of description of data fields and the data fields itself may be performed using advanced text analytics techniques like trained machine learning systems. This may build the basis for a subsequent step of the method, i.e., the matching the data attributes of the first specifications and the second specifications.

According to an advantageous embodiment, the method may also comprise building a repository of the plurality of data transformation adapters. The plurality of data transformation adapters may comprise adapters for various functions and a plurality of different transformations depending on front-/back-end applications (or parts thereof) and all different functions of the same application. It may be mentioned that not all possible data fields may have to be transformed for every application. Hence, from the plurality of data transformation adapters a "minimal adapter" may be derived comprising only those transformations required for the specific use case. This process may be transparent to the user and be performed in a very dynamic way without any human interaction.

According to a further developed embodiment of the method, the generating dynamically a plurality of the data transformation adapters may comprise selecting a data transformation adapter out of the plurality of the data transformation adapters, performing a first transformation of a set of data, e.g., using the complete data set—from a data producer unit being compliant to the first specifications to a data consumer unit being compliant to the second specifications. As an example, the first specifications may relate to the vendor Nokia and the second specifications may relate to the vendor Samsung. However, any other vendor combination may be possible.

Furthermore, embodiments may comprise performing a second transformation—in particular, using a different data model version—of the set of data from a data producer unit being compliant to the specifications of a first vendor to a data consumer unit being compliant to specifications of a different version of the same first vendor. Normally, this second type of transformation is not required. However, it may address a transformation of data of applications or data models of different versions, e.g., both being from Nokia or both being from Samsung to remain in the context of the above-mentioned example. This may assume that data definitions of different versions are not upwards compatible.

Then, upon the first transformation and the second transformation yielding an identical result, the method may comprise classifying the selected data transformation adapter as the verified adapter. Hence, this may be seen as a trial and error approach experimenting as long as required in order to generate identical results.

According to another further developed embodiment, the method may also comprise: upon the first transformation and the second transformation not yielding the identical result, selecting another data transformation adapter out of the plurality of the data transformation adapters, i.e., from the repository. This loop may be continued until a data transformation may be identified generating the same results. However, other stop conditions may also apply, e.g., a time-out condition or a maximum number of attempts.

According to another enhanced embodiment of the method, the generating a minimal data transformation child adapter from the verified adapter may also comprise continuously determining whether the minimal data transformation child adapter may still comply with the current dynamic performance requirements of the data consumer, and data attributes currently used by the application of the data consumer unit. Furthermore, embodiments may comprise: upon a negative outcome of the permanent re-determination—i.e., the step just before—generating or selecting from the repository and new minimal data transformation child adapter compliant with the current dynamic performance requirements of the data consumer, and the data attributes currently used by the application of the data consumer unit. Such an embodiment may also address dynamically changing data requirements of the data producer and data consumer units, e.g., the number of different data or their accuracy. Thus, the proposed concept may be expanded intelligently over and above the basic inventive concept.

According to a more advanced embodiment of the method, the dynamic performance requirements may be expressed by a dynamic performance requirement vector whose components indicate at least one of the following: a maximal allowed data time delay value for the application of the data consumer unit (this may, in particular, be helpful if the applications are distributed across several nodes), an infrastructure availability indicator along a communication path of the data communication environment between the data producer unit and the data consumer unit, a data consumption indicator value indicative of a number of— e.g., parallel demanding data consumer units requesting data values of the data attributes currently used by the applications on all demanding data consumer units, or a data production indicator value—e.g., a 'push indicator'—indicative of a number of producing data producer units pushing data values of the data attributes currently used by the applications on all demanding data consumer units. Typically, all four main components may be required for a seamlessly working complete system implementing the proposed method.

According to another embodiment, the method may also comprise storing the minimal data transformation child adapter in the adapter repository. Hence, they may be available for later use so that the required minimum data transformation child adapter does not have to be created each time required. At the same time, data for the performance and bottleneck conditions of that minimal data transformation child adapter may also be stored so that the same minimal data transformation child adapter may be retrieved from the repository again with the same or similar performance and bottleneck conditions may be present again.

According to another further developed embodiment, the method may also comprise using a trained machine-learning system for the analyzing first specifications and/or the analyzing second specifications, wherein the machine-learning system has been trained with labeled data qualified to train a machine-learning-model of the machine-learning system for a recognition of data exchange parameters. This may enable a fast and dynamic analysis of new specification document or changed requirements for the mapping of the data attributes.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments to which the invention is not limited.

Figure 1:
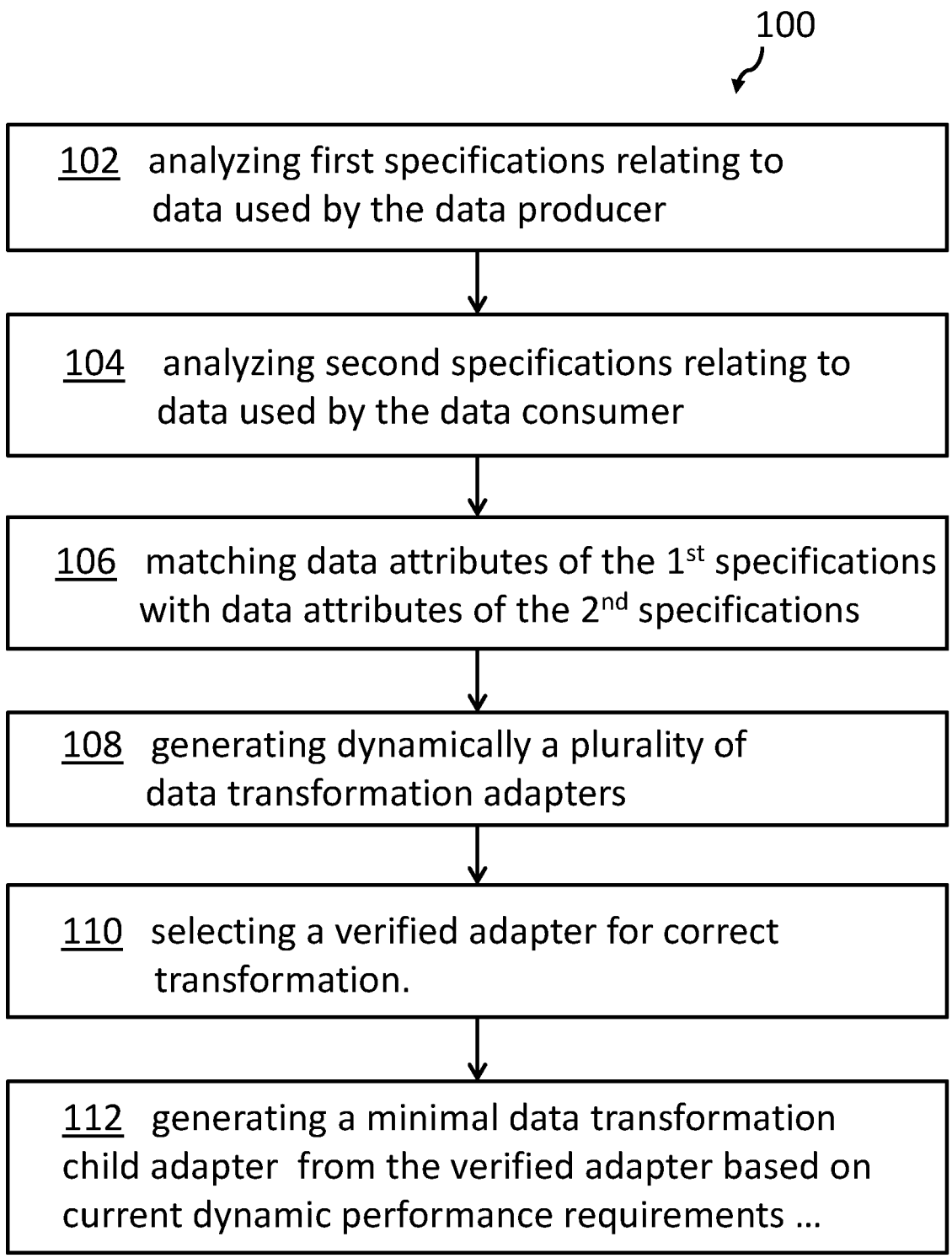

Preferred embodiments of the invention will be described, by way of example only, and with reference to the following drawings:

FIG. 1 shows a block diagram of an embodiment of the inventive computer-implemented method for creating a data transformation adapter for non-standardized data between a data producer unit and a data consumer unit in a data communication environment.

Figure 2:
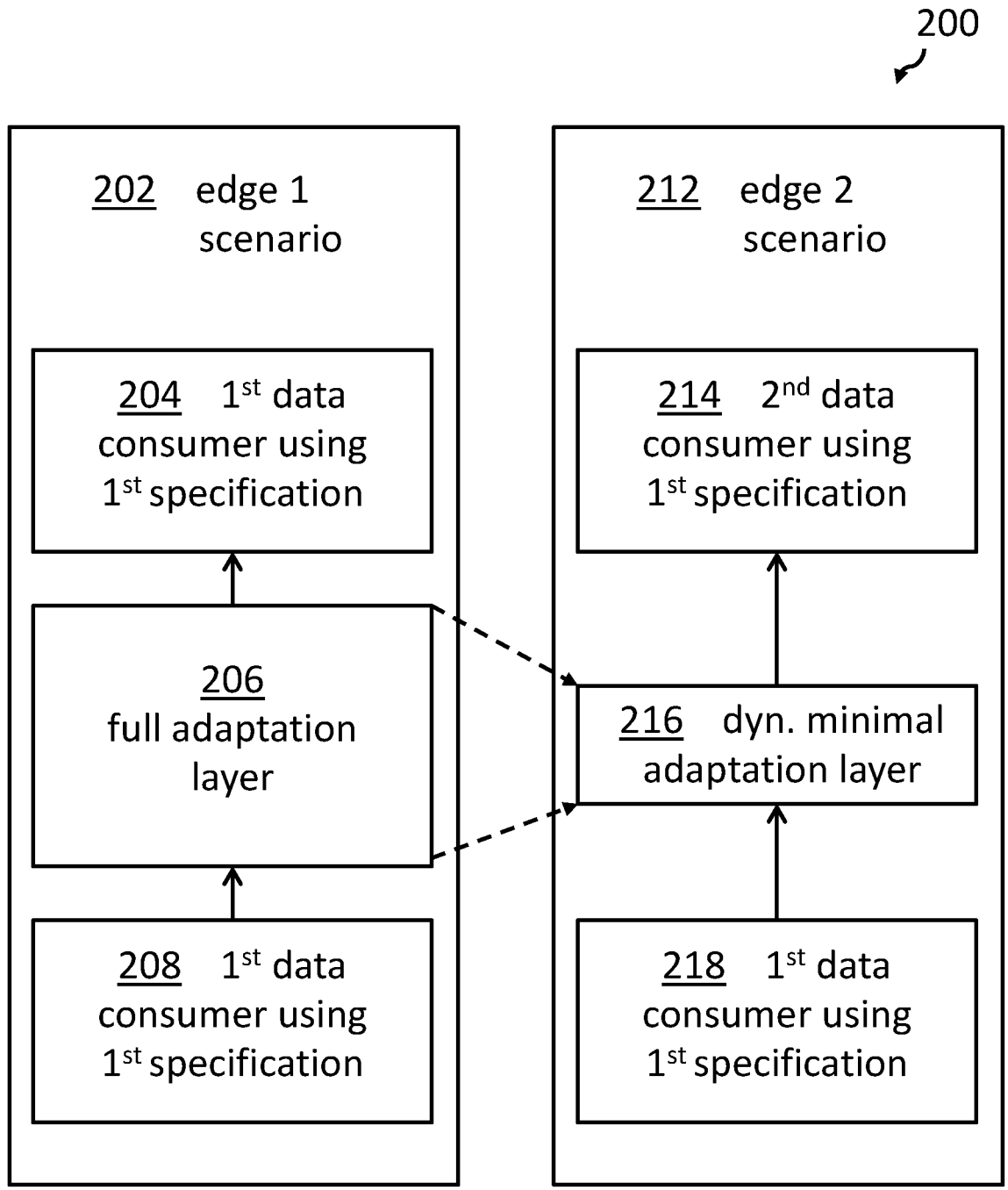

FIG. 2 shows a block diagram of two different edge scenarios with a full adaptation layer and a dynamic minimum adaptation layer.

Figure 3:
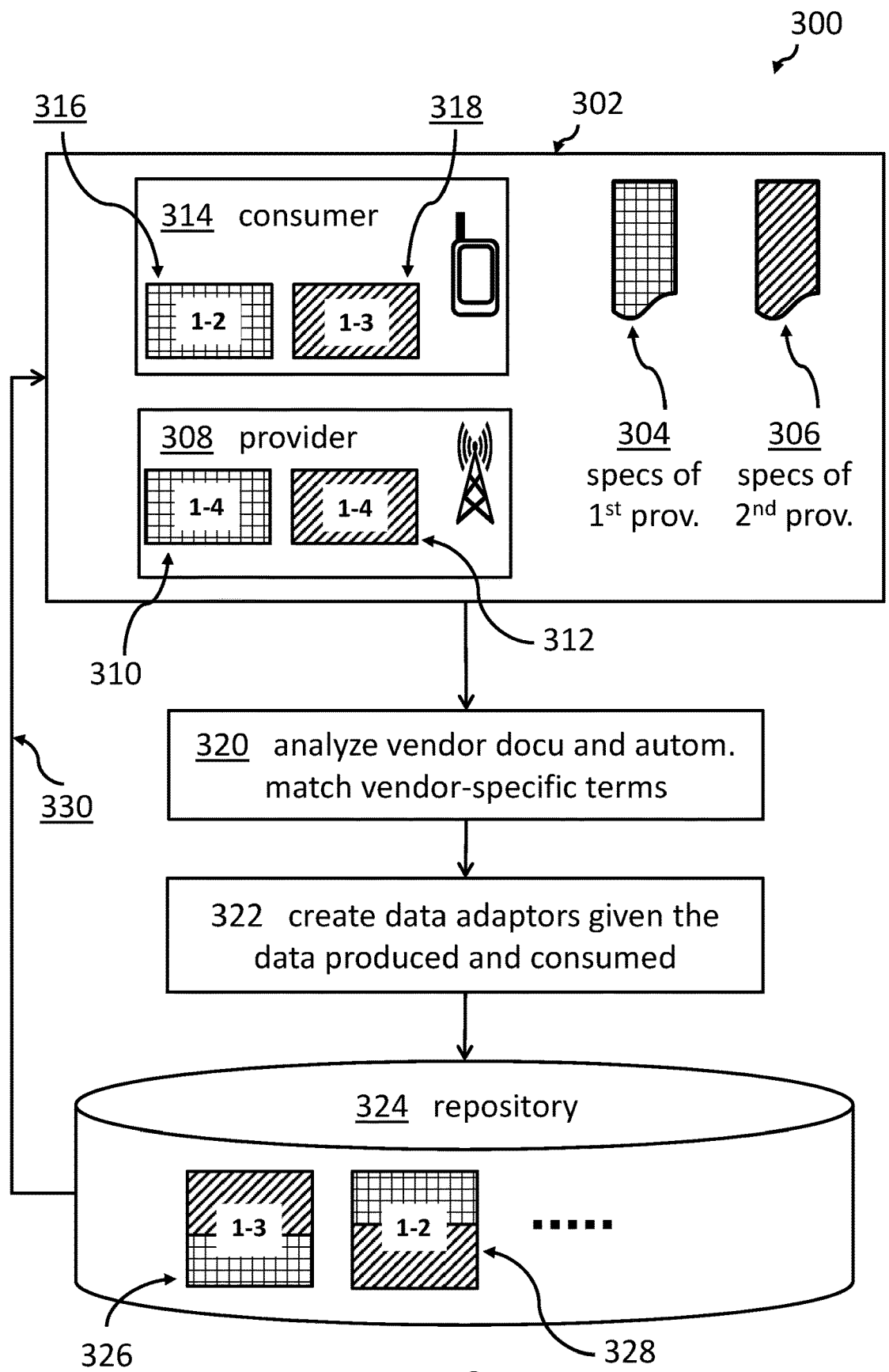

FIG. 3 shows a block diagram of an embodiment of a first more implementation-near set up.

Figure 4:
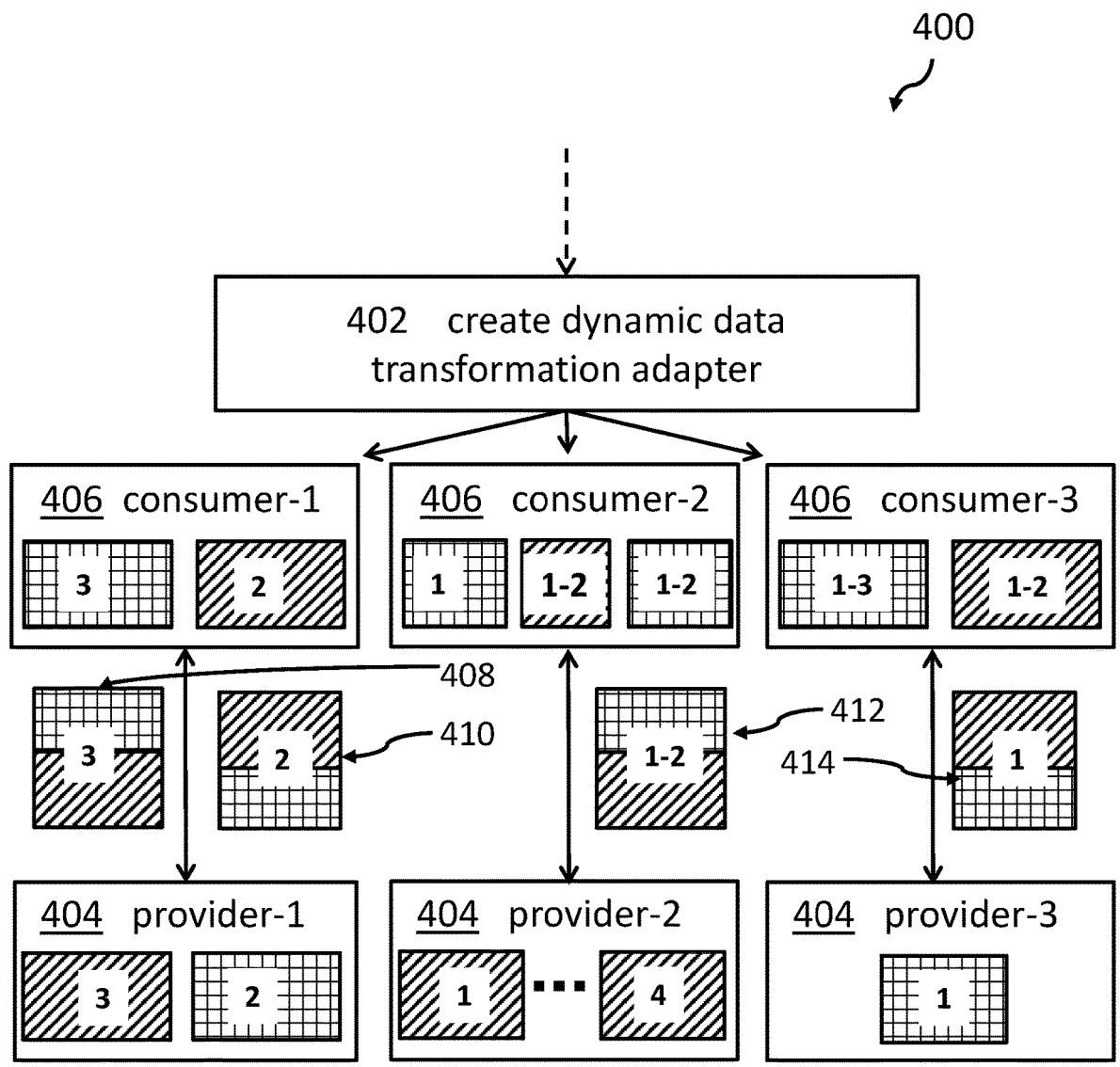

FIG. 4 shows a block diagram of an embodiment with a first exemplary data transformation adapter setting.

Figure 5:
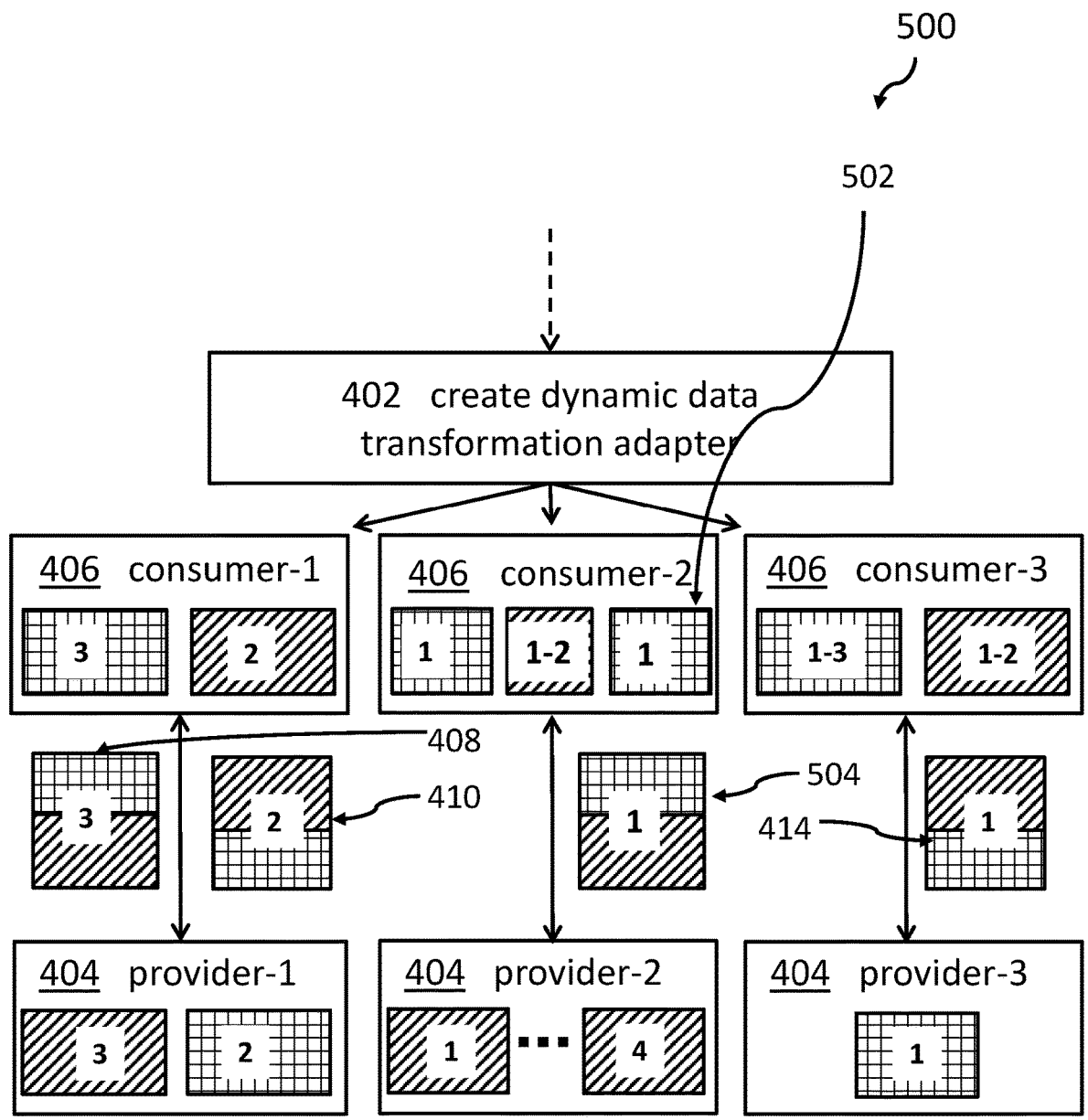

FIG. 5 shows a block diagram of an embodiment with a second exemplary data transformation adapter setting.

Figure 6:
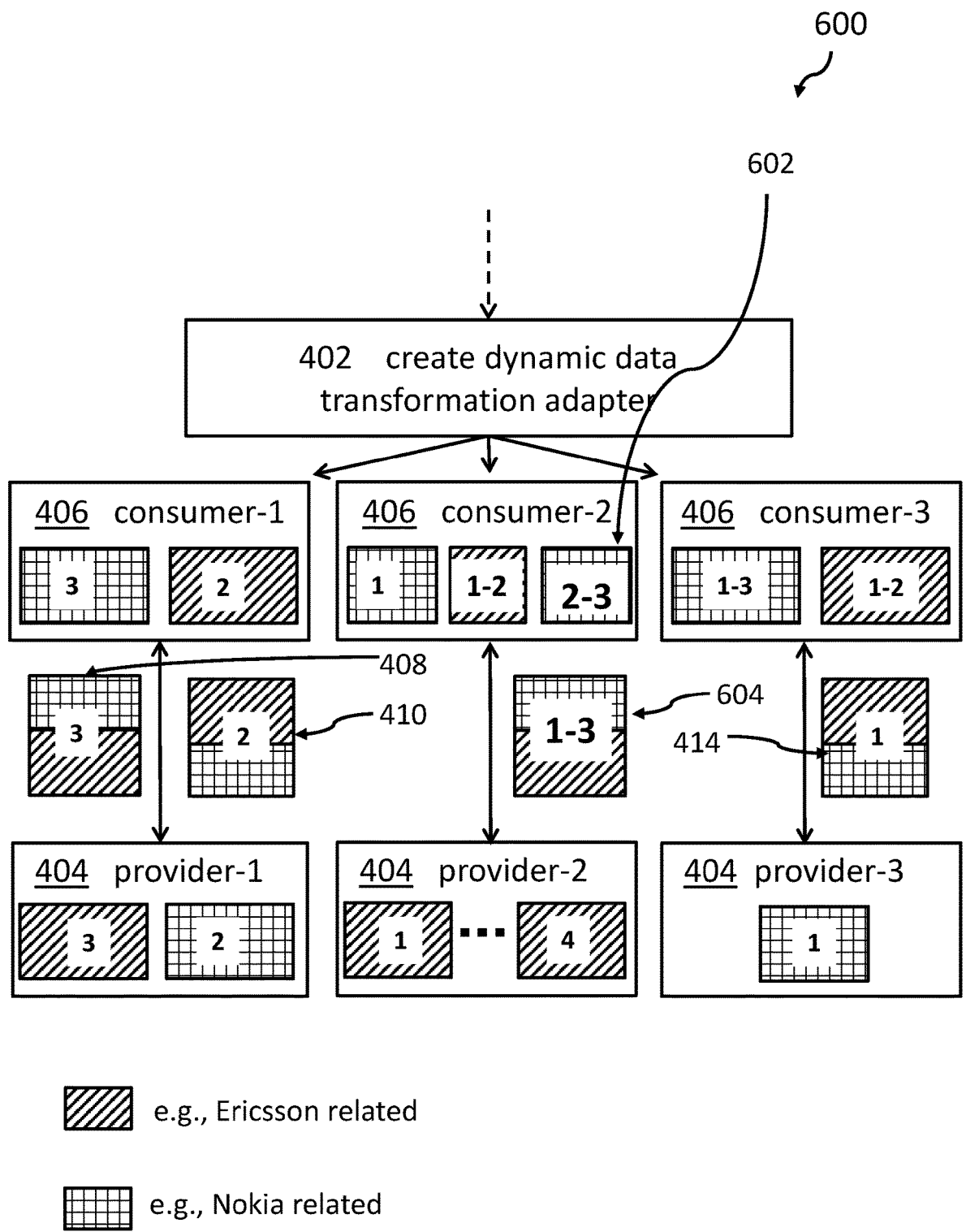

FIG. 6 shows a block diagram of an embodiment with a third exemplary data transformation adapter setting.

Figure 7:
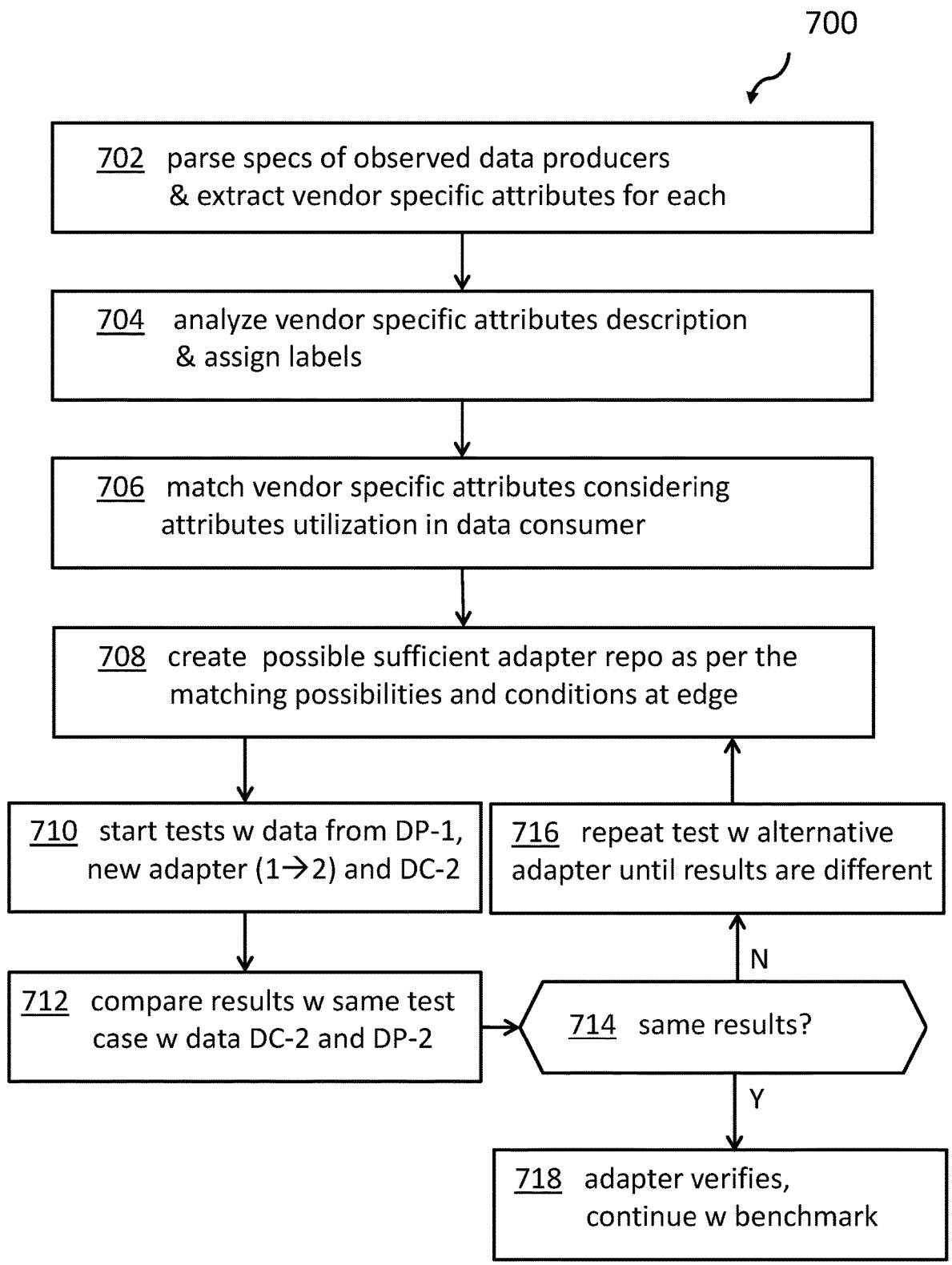

FIG. 7 shows a first portion of a flowchart of a more practical embodiment of the proposed concept.

Figure 8:
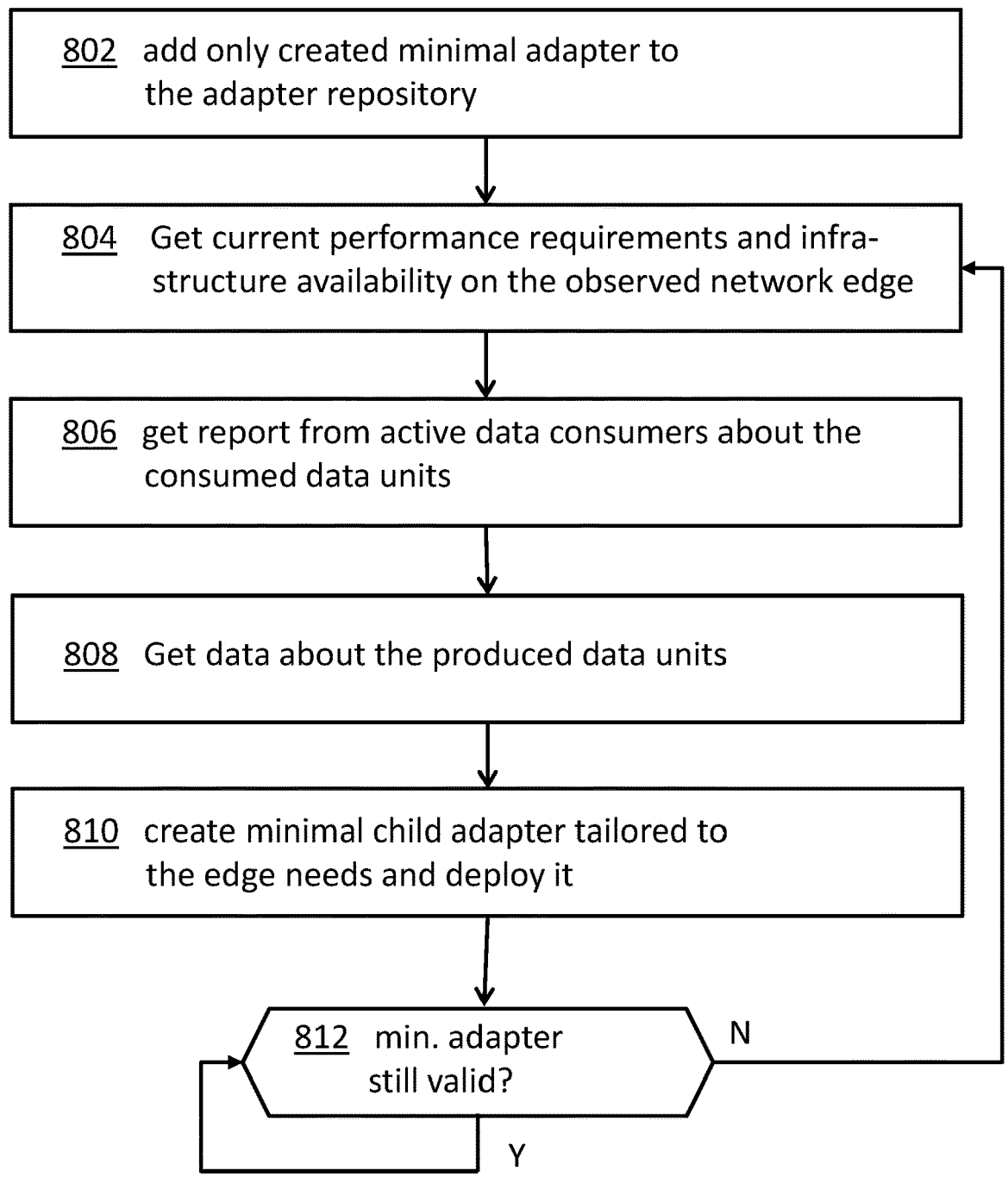

FIG. 8 shows a second portion of the flowchart of a more practical embodiment of the proposed concept.

Figure 9:
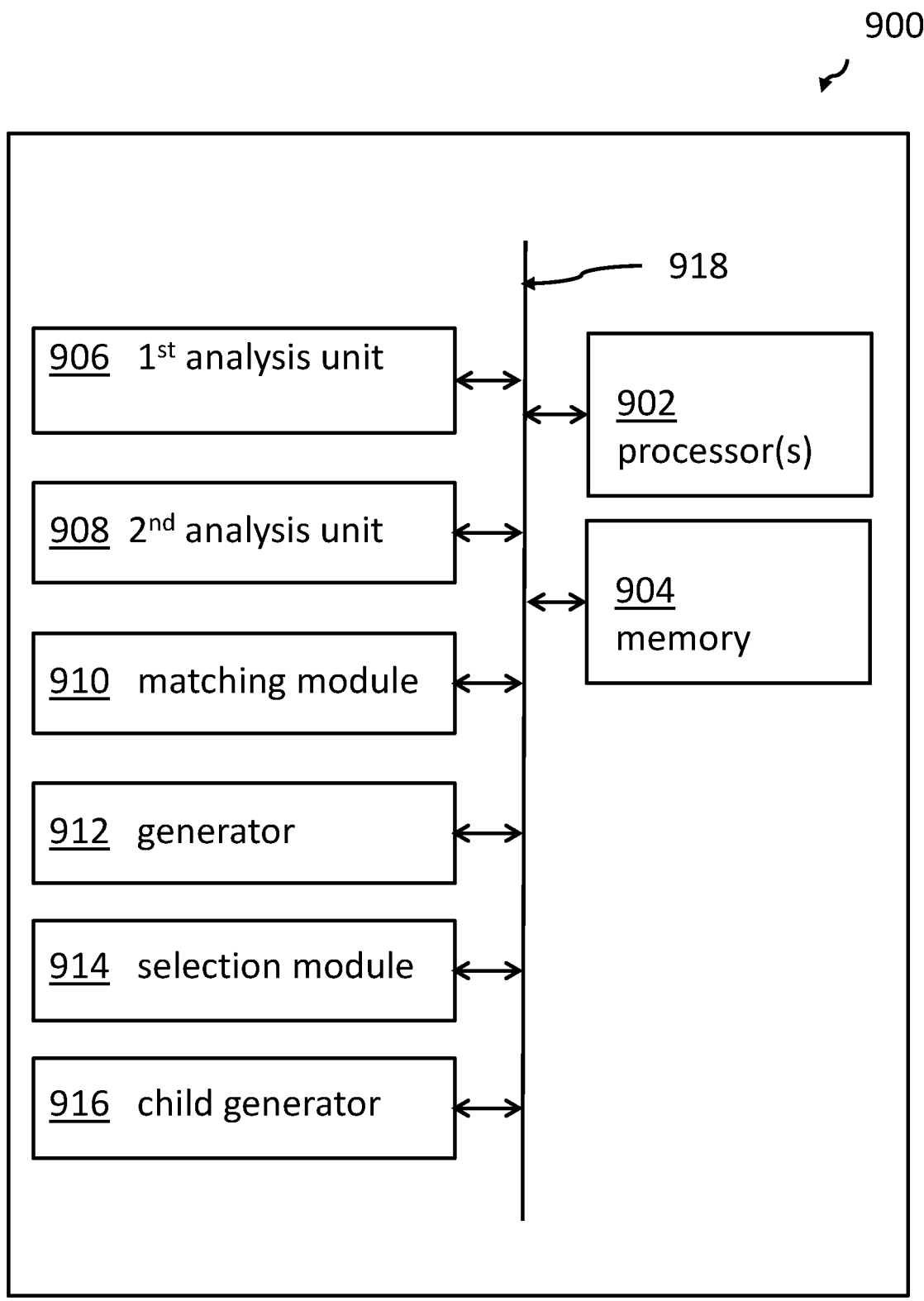

FIG. 9 shows a block diagram of an embodiment of the inventive dynamic data adapter generator system for creating a data transformation adapter for non-standardized data between a data producer unit and a data consumer unit in a data communication environment.

Figure 10:
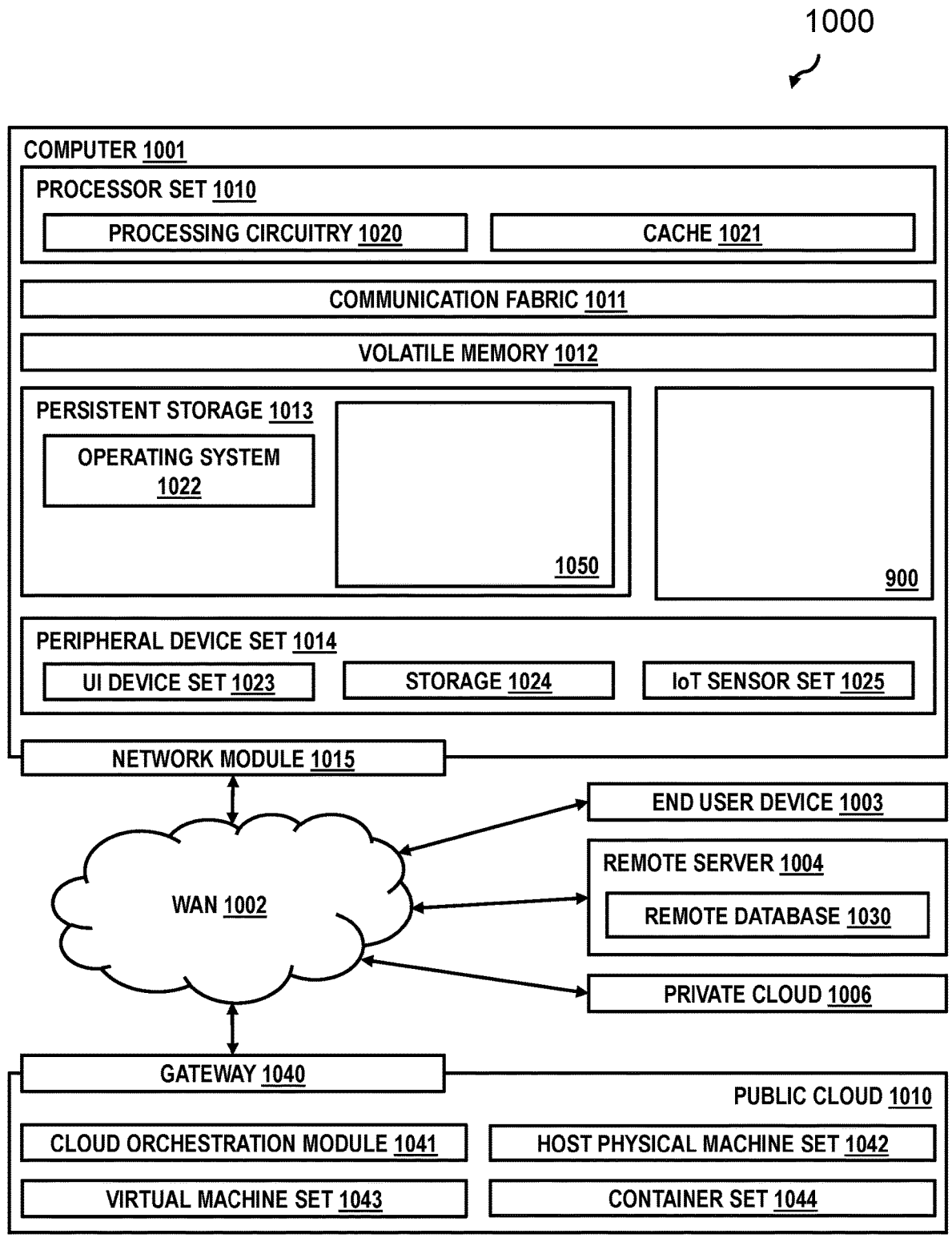

FIG. 10 shows an embodiment of a computing environment comprising the system according to FIG. 9.

DETAILED DESCRIPTION

In the context of this description, the following technical conventions, terms and/or expressions may be used:

The term 'data transformation adapter' may denote a tool driving a process of converting data from one form auto structure into another format or structure, i.e., from a data source to a data destination. This may enable a corporation and/or collaboration of applications using data of the same meaning in different formats or structures. This may happen if the different data formats relate to applications of different vendors, whereby the data do not underlie standardization rules. Thus, the term 'data transformation adapter' may also denote a realization of a data adaptation layer for a specific transformation from one data format structure to another one. The data transformation adapter may be generated or adapted to requirements in the dynamic way, whereby the adaptation happens automatically without any human involvement or configuration requirements, e.g., in real-time and as technically required.

The term 'non-standardized data' may denote those data in a mixed standardized/non-standardized environment in which a part of the data underlie standardization organization efforts, whereas other parts of used data have not been standardized. This may happen, in particular, in mobile telecommunication environments, e.g., in 5G or 6G or beyond telecommunication networks. The standardization of data formats is necessary to drive the cross-vendor fundamental functionality of the networks, whereas add-on functionality and related data formats may often be vendor-specific.

The term 'data producer unit' may denote a member, physical or logical device in a network acting as a data source. In contrast, the term 'data consumer unit' may denote a member, physical or logical device in a network acting as a data destination. The communication between the data producer unit and data consumer unit may work according to publish and subscribe or other communication mechanisms.

The term 'data communication environment' may denote here, in particular, mobile telecommunication networks according to modern standards like, 5G or 6G or beyond. However, the proposed concept may also work in other IT environments. E.g. in dynamic cloud computing and/or IoT (Internet of Things) environments.

The term 'specification' may denote here a description of data form lots of a specific vendor. Thereby, first specifications related to the first vendor may define the interference—in particular, non-standardized data fields—in a different way compared to second specifications related to a second vendor. Hence, although the data fields may relate to the same content-e.g., a measured physical value, geographical coordinates, a name field, and address field and so on—the related data structure may be different in both specifications. Thus, in order to exchange data with different data formats, an adaptation layer may be required in between.

The term 'dynamic' may denote here, that the just mentioned adaptation from one data definition to another data definition may happen "on-the-fly" or in real-time. I.e., the data may not be transformed in batch mode but during the active communication from one application to another application or components thereof. The same may apply to the required adaptation layer, i.e., used data transformation adapters. Also these may be adapted or applied on the request and transparent for the involved applications which may be compliant to different data definitions.

The term 'verified adapter' may denote a data transformation adapter for which it may have been proven that it delivers a correct transformation of data fields being compliant with the first and the second specifications.

The term 'transformed correctly' may denote that related data fields—although available in different formats on the source and destination side over a communication path—may have been adapted in such a way that the data on the data producer unit side have the same meaning as the data on the consumer unit side.

The term 'minimal data transformation child adapter' may denote a data transformation adapter that may transform only those data that is currently being used between a data source and a data destination. As an example, a complete data transformation adapter may transform a complete set of 20 different data fields if the data transformation adapter may be operated in full transformation mode. However, in a specific use case only five data fields may be required for a specific subset of the application functionality. Hence, the minimal data transformation child adapter which may be derived from the complete data transformation adapter would be limited to transform only the five data fields. This may allow a better usage of resources and increase the performance of the mobile network communication.

In the following, a detailed description of the figures will be given. All instructions in the figures are schematic. Firstly, a block diagram of an embodiment of the inventive computer-implemented method for creating a data transformation adapter for non-standardized data between a data producer unit and a data consumer unit in a data communication environment is given. Afterwards, further embodiments, as well as embodiments of the dynamic data adapter generator system for creating a data transformation adapter for non-standardized data between a data producer unit and a data consumer unit in a data communication environment will be described.

FIG. 1 shows a block diagram of a preferred embodiment of the computer-implemented method 100 for creating a data transformation adapter for non-standardized data between a data producer unit—e.g., a data source—and a data consumer unit—e.g., a data destination—in a data communication environment. Here, the data communication environment may, in particular, be related to modern mobile data communication networks, like 5G, 6G or beyond. It may also be applicable for the 4G telecommunication standard. The data producer unit and the data consumer unit may both be mobile network components, in particular, from different vendors, e.g., Nokia, Ericsson, Samsung and others. Moreover, the data producer unit and a data consumer unit may relate to physical or logical devices of the application layer of mobile applications or edge applications.

The method 100 comprises analyzing, 102, first specifications, like manuals, technical specifications, data descriptions related to data used, in particular to non-standard or non-standardized data fields by the data producer unit, and analyzing 104, second specifications relating to data used or consumed by the data consumer unit. Thereby, the first specifications and the second specifications are different from each other because they originate from different vendors or because they are related to different versions of data descriptions, e.g., related to different application versions or communication equipment generations.

Furthermore, the method 100 comprises matching, 106, data attributes of the first specifications with data attributes of the second specifications. Thereby, the matching process relates to data fields of the source and the destination to each other. For this process, data definition repositories, machine learning techniques or other advanced text analysis tools may be used.

Moreover, the method 100 comprises generating, 108, dynamically a plurality of data transformation adapters using the identified and matched data attributes. This happens typically "on the fly", i.e., in real-time. Alternatively, it may also be performed off-line. It should also be considered that a plurality of data transformation adapters are generated because not each data transformation adapter may deliver a perfect matching. Hence, it can be useful to find out which of the plurality of the data transformation adapters performs the best data transformation in the sense that the data is transformed from the data of the data producer unit to the data consumer unit in a way that the transformed data have the same meaning in both environments.

Consequently, the method 100 comprises selecting, 110, a verified adapter ensuring that matched data attributes of the first specifications and the data attributes of the second specifications are transformed correctly. Different techniques may be used for this, as described above for the set of different embodiments.

The method 100 further comprises generating, 112, a minimal data transformation child adapter from the verified adapter based on current dynamic performance requirements of the data consumer and data attributes currently used by an application of the data consumer unit. This minimal data transformation child adapter transforms only the data required for a specific use case, e.g., only six data fields out of, e.g., 21.

FIG. 2 shows a block diagram 200 of two different edge scenarios with a full adaptation layer and a dynamic minimum adaptation layer. In the edge 1 scenario 202, the first data producer unit 208 handles specific data fields according to a first specification, while the first data consumer unit 204 uses a second specifications for the data fields relating to the same physical properties. For this case, a full adaptation layer 206 is shown which is capable of transforming all data fields relating to specific applications.

In contrast, the edge 2 scenario 212 shows the dynamic minimum adaptation layer 216 or dynamic minimum data transformation adapter that can be seen as part of the dynamic minimum adaptation layer 216. In this case, only those data fields for the use case of the edge 2 scenario 212 are transformed from the second data producer unit 218 to the second data consumer unit 214 using data according to the second specifications. In order to picture the scenarios a little bit better, it may be assumed that the data producers are working according to specifications, while the data consumers are working according to Ericsson specifications.

FIG. 3 shows a block diagram of an embodiment 300 of a first more implementation-near setup. The rectangle 302 symbolizes a test environment in order to generate a repository 324 of data transformation adapters. The two different specifications of different providers—for comprehensibility reasons again, Nokia and Ericsson—are shown as specifications 304 of a first provider and specifications 306 of a second provider. It shall also be understood that any of the vendors or providers can act as data consumer units and/or data producer units and that also any other vendors, e.g., also Samsung or others, can take the role of the data producer unit or a data consumer unit. It should also be assumed that information about all data consumers and data producers is managed and stored in the repository.

On the data provider side 308 (i.e., data producer unit), both vendors are shown as supporting applications 310, 312 with data specification groups 1 to 4. For simplicity reasons, it may be assumed that the data specification groups 1 to 4 relate to distinct applications 1 to 4. As an example, the application groups 310 relate to data specifications 304 of the first provider; this is symbolized by the squared background.

On the other side, the data consumer side 314 (i.e., data consumer unit), also applications of the different vendors (being compliant with specifications 304 or specifications 306) are shown. The applications 1 to 2 (316) shown to be compliant to the specifications 304 of the first provider, whereas the applications 1 to 3 (318) are compliant to the specifications 306 of the second provider. Hence, here is shown that applications of the same provider can be on the data producer as well as on the data consumer side. Hence, if "Nokia-produced data" (e.g., with crossed specifications) are to be used by "Ericsson-consuming data" applications (e.g., symbolized by diagonal stripes), a data transformation has to be used. Typically, if "Nokia-produced data" are used by "Nokia-consuming data" applications, no transformation is required unless different data specifications of different incompatible versions are used.

For this adaptation, the vendor documentation (i.e., specifications 304, 306) are analyzed and a matching of vendor-specific terms for data fields relating to the same physical entities is performed, 320. In the next step, data transformation adapters are created or generated based on the data produced and consumed, 322. As a result, a repository 324 is built comprising a plurality of data adapters 326 transforming data from the Nokia environment to the Ericsson environment, as well as adapters transforming from the Ericsson environment to the environment (again, any other vendors may replace Nokia and Ericsson). The Nokia/Ericsson data transformation adapter(s) 326 are shown for application 1 to 3, whereas the Ericsson solution adapter(s) 328 are shown for only the applications 1 to 2. For a direct use, the adapters can be retrieved directly from the repository, as indicated by the connection 330.

FIG. 4 shows a block diagram of an embodiment 400 with a first exemplary data transformation adapter setting. In addition to FIG. 4, FIGS. 5 and 6 also address the topic of creating or generating, 402, the minimal dynamic data transformation adapters. In order to demonstrate the dynamic of the adaptation layer between a data producer unit—here denoted as provider-i, i=1..3 with reference numerical 404—and a data consumer unit which is here denoted as consumer-i, i=1..3 with reference numerical.

Just for the sake of clarity, since the two providers of specifications for data fields, Nokia—symbolized by a hashed background—and Ericsson—symbolized by a diagrammatic striped background—are mentioned as examples. It should be understood that any other combination of any other vendors with their specific data field descriptions is addressed by the proposed inventive concept.

The figure differentiates between three different edge scenarios: (i) the most left one refers to the provider-1 406 and consumer-1 404, (ii) the middle one refers to the provider-2 406 and consumer-2 404, and (iii) the most left one refers to the provider-3 406 and consumer-3 404. All scenarios—and more—can exist in parallel in real-life telecommunication environments.

The middle layer between the data providers and data consumers represents the adaptation layer with data transformation adapters 408, 410, 412, 414.

Hence, data consumer-1 unit deploys application "3" using Nokia data field specifications as well as application "2" with Ericsson data field specifications. The data provider unit-1 provides data out of an Ericsson related application component (button left striped box), here, relating to application "3" and data out of a Nokia related application component, here relating to application "2". Comparable situations are given for the second edge scenario (in the middle) and, the third edge scenario (on the right side).

Referring to the first edge scenario of provider-1 and consumer-1, the split application "3" works according to the Ericsson specifications on the data producer unit side 404; on the data consumer unit side 406, the same split application "3" works with Nokia related data field descriptions. Hence, a data transformation is required. This is performed by the dynamic minimize data transformation adapter 408, which performs only the required data transformation for the split application use case "3"

A similar scenario is related to the split application "2" which works according to Nokia specification on the data producer unit 404 side and according to Ericsson specifications at the data consumer unit 406 side.

A similar logic can be recognized in the second edge scenario in the middle. Here, four parts of applications 1 . . . 4 ("1" . . . "4") are provided by the data producer unit 404 (in Ericsson format). On the data consumer unit 406 side, three boxes representing three application components are shown. The most left one shows a "1" referring to application component "1" using Nokia specifications, and a most right one referring to the application components "1-2".

The application component shown in the middle for data consumer-2 is shown as application components "1-2", meaning that data for these partial applications 1 and 2 are required. In the adaptation layer between the data producer and data consumer, only one dynamic minimum data transformation adapter 412 is shown and required. This is because also for non-standardized data a data transformation from the data producer side to the data consumer side for data compliant to the same specification, is not required.

Hence, the minimal data transformation adapter 412 performs only a data transformation from Ericsson related application components to Nokia related application components; in this case, only data transformation tasks for application components "1-2" 412 are required. For the data producer components "3" and "4" not any transformation task is required because no data consumer unit is in demand for these application data. Therefore, no minimal data transformation adapter is shown in the adaptation layer of the second (middle) edge scenario.

Similar logic may be applied to the third edge scenario (right side). Although the application components of the data consumer side comprise "1-3" application components according to the Nokia data field specifications and "1-2" application components according to the Ericsson data field specifications, only the dynamic minimum data transformation adapter 414 is required being adapted for performing the data transformation for application component "1" from a Nokia environment (data producer side) to an Ericsson environment (data consumer side).

In the following (FIGS. 5 and 6), the edge scenarios 1 and 3 remain unchanged. Therefore, the focus is on the edge scenario 2 in the middle.

FIG. 5 shows a block diagram of an embodiment 500 with a second exemplary data transformation adapter setting. As can be seen by comparison, now the right consumer side application 502 of the second scenario, involving data consumer-2 406 is denoted as "1" (which was "1-2" in FIG. 4). Consequently, the dynamic minimum data transformation adapter 504 needs only transforming Ericsson to Nokia data fields for application "1". Hence, the number of transformed data fields from one vendor environment to another is reduced, increasing performance or reducing computational and/or communication requirements of/for the adaptation layer.

FIG. 6 shows a block diagram of an embodiment 600 with a third exemplary data transformation adapter setting. Now, the application component 602 on the data consumer side requires data for the application components "2-3". With the rest remaining unchanged, now, a dynamic minimum data transformation adapter 604 is required supporting data transformation tasks for application areas "1-3" from an Ericsson application component on the data producer side to a Nokia application component on the data consumer side.

As a conclusion, the sequence of FIGS. 4 to 6 should have given an impression of the dynamic behavior of the adaptation layer depending on the dynamically changing application layer requirements. Hence, a permanent assessment of the adaptation layer requirements has to be performed in order to select and provide or generate the always current data transformation adapter between the data producer and the data consumer side. It may also be kept in mind that the roles of the data consumer side and the data producer side may be exchanged.

FIG. 7 shows a first portion of a flowchart 700 of a more practical embodiment of the proposed concept. According to the proposed concept, firstly, the specifications of the different data producers/data consumers are parse, 702, and vendor specific attributes are extracted for each. Next, the vendor specific attribute description is analyzed and labels are assigned, 704.

Then, the vendor specific attributes are matched, 706, considering attribute utilization on the data consumer side. As next step, tests are started with data from data producer-1 (DP-1), a new adapter (1→2) and that data consumer-2 (DC-1); it may be noted, that this nomenclature shall not be confused with the one used in the FIGS. 4 to 6 because they are not directly involved in any edge scenarios. The results are then compared 712 with the results of the same test (i.e., the same new transformation adapter (1→2)) for a data transformation from data producer-2 to data consumer-2, i.e., thereby, staying in the framework of the same data field specifications so that no transformation would be required.

If the results of the steps 710 and 712 are identical (determination 714)—case "Y"—the adapter is classified as "verified", 718, and the process continues with a benchmark in FIG. 7.

If the results are not identical—case "ON"-, the test is repeated, 716 with an alternative adapter. The loop of the steps 708, 710, 712, 714 and 716 are repeated until the same results are generated in the determination 714. The so generated general data transformation adapters are then stored in the repository for further use. This process of generating general data transformation adapters—i.e., adapters adapted for a complete data transformation for a specific application "n"—may be performed off-line, i.e., not in the dynamic way of applying the dynamic minimal data transformation adapters "on the fly"/in real-time. However, if new requirements arise, also this adapter generation may be performed in real-time.

FIG. 8 shows a second portion 800 of the flowchart 700 of FIG. 7 of the more practical embodiment of the proposed concept. This portion of the flowchart relates to the benchmarking component of the proposed concept. It starts with adding, 802, a created or generated minimal data transformation adapter to the data repository. Then, current performance requirements and infrastructure availability on the orbs of network edge is determined, 804. Furthermore, a report from active data consumers about the consumed data amounts is generated, 806. In a similar way, data about the produced data amounts is generated, 808. With this, the boundary conditions for a creation of a minimum data transformation child adapter (i.e., a child of the minimart data transformation adapter) are set. Based on this, the minimum data transformation child adapter tailored to the specific needs of the edge is created and deployed, 810.

Optionally, periodically or according to a predefined time schedule it may be determined, 812, whether the minimum data transformation child adapter requirements are still met. If that is not the case, the process loops back to determining, 804, current performance requirements and infrastructure availability on the observed network edge.

FIG. 9 shows a block diagram of an embodiment of the dynamic data adapter generator system 900 for creating a data transformation adapter for non-standardized data between a data producer unit and a data consumer unit in a data communication environment. The system comprises one or more processors 902 and a memory operatively coupled to the one or more processors 902, wherein the memory 904 stores program code portions that, when executed by said one or more processors 902, enable the one or more processors 902 to analyze first specifications—in particular using a first analysis unit 906—related to data used by the data producer unit, and analyzing second specifications—in particular, using also the first analysis or the second analysis unit 908—related to data used by the data consumer unit. Thereby, the first specifications and the second specifications are different from each other.

Furthermore, the one or more processors 902 are also enabled to match data attributes of the first specifications—in particular using a matching module 910—with data attributes of the second specifications, and to generate dynamically a plurality of data transformation adapters using the matched data attributes, in particular using a generator.

Additionally, the one or more processors 902 are also enabled to select a verified adapter—in particular using a selection module 914—ensuring that matched data attributes of the first specification and the data attributes of the second specifications are transformed correctly, and to generating a minimal data transformation child adapter—in particular using a child generator 916—from the verified adapter based on current dynamic performance requirements of the data consumer and data attributes currently used by an application of the data consumer unit.

It shall also be mentioned that all functional units, modules and functional blocks—in particular the one or more processors 900 to, the memory 900 for, the first analysis unit 906, the second analysis unit 908, the matching module 910, the generator 912, the selection module 914 and the chart generator 916—may be implemented in hardware—e.g., using FPGAs or similar components—which are communicatively coupled to each other for signal or message exchange in a selected 1:1 manner. Alternatively, the functional units, modules and functional blocks can be linked to a system internal bus system 918 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read—only memory (ROM), erasable programmable read—only memory (EPROM or Flash memory), static random access memory (SRAM), compact disc read—only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de—fragmentation or garbage collection, but this does not render the storage device as transitory because the data is not transitory while it is stored.

FIG. 10 shows a computing environment 900 comprising an example of an environment for the execution of at least some of the computer code involved in performing the inventive methods, such as the computer-implemented method for creating a data transformation adapter for non-standardized data between a data producer unit and a data consumer unit in a data communication environment, 1050.

In addition to block 1050, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1050, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer—implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located off chip. In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer—implemented method, such that the instructions thus executed will instantiate the methods specified in flowcharts and/or narrative descriptions of computer-implemented methods included in this document (collectively referred to as the inventive methods). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1050 in persistent storage 1013.

COMMUNICATION FABRIC 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and /or directly to persistent storage 1013. Persistent storage 1013 may be a read only memory (ROM), but typically at least a portion of the persistent storage allows writing of data, deletion of data and re—writing of data. Some familiar forms of persistent storage include magnetic disks and solid state storage devices. Operating system 1022 may take several forms, such as various known proprietary operating systems or open source Portable Operating System Interface type operating systems that employ a kernel. The code included in block 1050 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (e.g., embodiments that utilize software—defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non—local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on—demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating—system—level virtualization. This refers to an operating system feature in which the kernel allows the existence of multiple isolated user—space instances, called containers. These isolated user—space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

It should also be mentioned that the dynamic data adapter generator system 900 (compare FIG. 9) for creating a data transformation adapter for non-standardized data between a data producer unit and a data consumer unit in a data communication environment can be an operational subsystem of the computer 1001 and may be attached to a computer-internal bus system.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The inventive concept may be summarized by the following clauses:
1. A computer-implemented method for creating a data transformation adapter for non-standardized data between a data producer unit and a data consumer unit in a data communication environment, said method comprising:
   analyzing first specifications relating to data used by said data producer unit, and analyzing second specifications relating to data used by said data consumer unit, wherein said first specifications and said second specifications are different to each other;
   matching data attributes of said first specifications with data attributes of said second specifications;
   generating dynamically a plurality of data transformation adapters (DTA) using said matched data attributes;
   selecting a verified adapter ensuring that said matched data attributes of said first specification and said data attributes of said second specifications are transformed correctly; and generating a minimal data transformation child adapter from said verified adapter based on current dynamic performance requirements of a data consumer, and data attributes currently used by an application of said data consumer unit.

2. The method according to clause 1, wherein said analyzing said first specifications and said analyzing said second specifications comprises assigning labels to identified data attributes.

3. The method according to clause 1, further comprising building a repository of said plurality of data transformation adapters.

4. The method according to clause 1, wherein said generating dynamically a plurality of said data transformation adapters comprises:
   selecting a data transformation adapter out of said plurality of said data transformation adapters;
   performing a first transformation of a set of data from a data producer unit being compliant to said first specifications to a data consumer unit being compliant to said second specifications;
   preforming a second transformation of said set of data from a data producer unit being compliant to said first specifications to a data consumer unit being compliant to said first specifications; and
   upon said first transformation and said second transformation yielding an identical result:
      classifying said selected data transformation adapter as said verified adapter.

5. The method according to clause 4, further comprising:
   upon said first transformation and said second transformation not yielding said identical result:
      selecting another data transformation adapter out of said plurality of said data transformation adapters.

6. The method according to clause 1, wherein said generating a minimal data transformation child adapter from said verified adapter further comprises:
   determining continuously whether said minimal data transformation child adapter still complies to said current dynamic performance requirements of said data consumer, and data attributes currently used by said application of said data consumer unit; and
   upon a negative outcome said continuous determination:
      generating a new minimal data transformation child adapter compliant to said current dynamic performance requirements of said data consumer, and said data attributes currently used by said application of said data consumer unit.

7. The method according to clause 6, wherein said dynamic performance requirements are expressed by a dynamic performance requirement vector which components are indicative of at least one of: a maximal allowed data delay value for said application of said data consumer unit, an infrastructure availability indicator value along a communication path of said data communication environment between said data producer unit and said data consumer unit, a data consumption indicator value indicative of a number of demanding data consumer units requesting data values of said data attributes currently used by said applications on all demanding data consumer units, or a data production indicator value indicative of a number of producing data producer units pushing data values of said data attributes currently used by said applications on all demanding data consumer units.

8. The method according to clause 1, further comprising: storing said minimal data transformation child adapter in said adapter repository.

9. The method according to clause 1, further comprising: using a trained machine-learning system for the analyzing first specifications and/or the analyzing second specifications, wherein the machine-learning system has been trained with labeled data qualified to train a machine-learning-model of the machine-learning system for a recognition of data exchange parameters.

10. A dynamic data adapter generator system for creating a data transformation adapter for non-standardized data between a data producer unit and a data consumer unit in a data communication environment, said dynamic data adapter generator system comprises:
    one or more processors and a memory operatively coupled to said one or more processor, wherein said memory stores program code portions which, when executed by said one or more processors, enable said one or more processors to:
      analyze first specifications related to data used by said data producer unit;
      analyze second specifications related to data used by said data consumer unit, wherein said first specifications and said second specifications are different from each other;
      match data attributes of said first specifications with data attributes of said second specifications;
      generate dynamically a plurality of data transformation adapters (DTA) using said matched data attributes;
      select a verified adapter ensuring that matched data attributes of said first specification and said data attributes of said second specifications are transformed correctly; and
      generate a minimal data transformation child adapter from said verified adapter based on current dynamic performance requirements of a data consumer, and data attributes currently used by an application of said data consumer unit.

11. The dynamic data adapter generator system according to clause 11, wherein said analyzing said first specifications and said analyzing said second specifications comprises assigning labels to identified data attributes.

12. The dynamic data adapter generator system according to clause 10, wherein said one or more processors are further enabled to build a repository of said plurality of data transformation adapters.

13. The dynamic data adapter generator system according to clause 10, wherein said generating dynamically a plurality of said data transformation adapters comprises: selecting a data transformation adapter out of said plurality of said data transformation adapters;
    performing a first transformation of a set of data from a data producer unit being compliant with said first specifications to a data consumer unit being compliant with said second specifications;
    preforming a second transformation of said set of data from a data producer unit being compliant with said first specifications to a data consumer unit being compliant with said first specifications; and
    upon said first transformation and said second transformation yielding an identical result:
      classifying said selected data transformation adapter as said verified adapter.

14. The dynamic data adapter generator system according to clause 13, wherein said one or more processors are further enabled to, upon said first transformation and said second transformation not yielding said identical result:
  select another data transformation adapter out of said plurality of said data transformation adapters.

15. The dynamic data adapter generator system according to clause 10, wherein said generating a minimal data transformation child adapter from said verified adapter further comprises:
  determining continuously whether said minimal data transformation child adapter still complies with said current dynamic performance requirements of said data consumer, and data attributes currently used by said application of said data consumer unit; and
  upon a negative outcome said continuous determination:
    generating a new minimal data transformation child adapter compliant with
  said current dynamic performance requirements of said data consumer, and said data attributes currently used by said application of said data consumer unit.

16. The dynamic data adapter generator system according to clause 15, wherein said dynamic performance requirements are expressed by a dynamic performance requirement vector which components are indicative of at least one of:
  a maximal allowed data delay value for said application of said data consumer unit, an infrastructure availability indicator value along a communication path of said data communication environment between said data producer unit and said data consumer unit, a data consumption indicator value indicative of a number of demanding data consumer units requesting data values of said data attributes currently used by said applications on all demanding data consumer units, or a data production indicator value indicative of a number of producing data producer units pushing data values of said data attributes currently used by said applications on all demanding data consumer units.

17. The dynamic data adapter generator system according to clause 10, wherein said one or more processors are further enabled to store said minimal data transformation child adapter in said adapter repository.

18. The dynamic data adapter generator system according to clause 10, wherein said one or more processors, during the analysis of the first specifications and the second specifications, are further enabled to:
  use a trained machine-learning system, wherein the machine-learning system has been trained with labeled data qualified to train a machine-learning-model of the machine-learning system for a recognition of data exchange parameters.

19. A computer program product for creating a data transformation adapter for non-standardized data between a data producer unit and a data consumer unit in a data communication environment, said computer program product comprising a computer readable storage medium having program instructions embodied therewith, said program instructions being executable by one or more computing systems or controllers to cause said one or more computing systems to:
  analyze first specifications related to data used by said data producer unit;
  analyze second specifications related to data used by said data consumer unit, wherein said first specifications and said second specifications being different from each other;
  match data attributes of said first specifications with data attributes of said second specifications;
  generate dynamically a plurality of data transformation adapters using said matched data attributes;
  select a verified adapter ensuring that matched data attributes of said first specifications and said data attributes of said second specifications are transformed correctly; and
  generate a minimal data transformation child adapter from said verified adapter based on current dynamic performance requirements of a data consumer, and data attributes currently used by an application of said data consumer unit.

What is claimed is:

1. A computer-implemented method for creating a data transformation adapter for non-standardized data between a data producer unit and a data consumer unit in a data communication environment, said method comprising:
  analyzing first specifications relating to data used by said data producer unit, and second specifications relating to data used by said data consumer unit, wherein said first specifications and said second specifications are different from each other;
  matching data attributes of said first specifications with data attributes of said second specifications, wherein said matched data attributes have different data formats but relate to the same content;
  generating dynamically a plurality of data transformation adapters using said matched data attributes;
  selecting a data transformation adapter from said plurality of data transformation adapters, said data transformation adapter being selected based on verifying that said data transformation adapter correctly transforms said matched data attributes of said first and second specifications such that said transformed matched data attributes are compliant with said first and second specifications; and
  generating a minimal data transformation child adapter from said verified data transformation adapter based on current dynamic performance requirements of a data consumer, and data attributes currently used by an application of said data consumer unit.

2. The computer-implemented method of claim 1, wherein said analyzing said first specifications and said analyzing said second specifications comprises assigning labels to identified data attributes.

3. The computer-implemented method of claim 1, further comprising building a repository of said plurality of data transformation adapters.

4. The computer-implemented method of claim 1, wherein said selecting a data transformation adapter from said plurality of said data transformation adapters further comprises:
  performing a first transformation of a set of data from a data producer unit being compliant to said first specifications to a data consumer unit being compliant to said second specifications;
  performing a second transformation of said set of data from a data producer unit being compliant to said first specifications to a data consumer unit being compliant to said first specifications; and
  upon said first transformation and said second transformation yielding an identical result:

classifying said selected data transformation adapter as said verified data transformation adapter.

5. The computer-implemented method of claim 4, further comprising, upon said first transformation and said second transformation not yielding said identical result:
selecting another data transformation adapter out of said plurality of said data transformation adapters.

6. The computer-implemented method of claim 1, wherein said generating a minimal data transformation child adapter from said verified data transformation adapter further comprises:
determining continuously whether said minimal data transformation child adapter still complies to said current dynamic performance requirements of said data consumer, and data attributes currently used by said application of said data consumer unit; and
upon a negative outcome of said continuous determination:
generating a new minimal data transformation child adapter compliant to said current dynamic performance requirements of said data consumer, and said data attributes currently used by said application of said data consumer unit.

7. The computer-implemented method of claim 6, wherein said dynamic performance requirements are expressed by a dynamic performance requirement vector which components are indicative of at least one of: a maximal allowed data delay value for said application of said data consumer unit, an infrastructure availability indicator value along a communication path of said data communication environment between said data producer unit and said data consumer unit, a data consumption indicator value indicative of a number of demanding data consumer units requesting data values of said data attributes currently used by said applications on all demanding data consumer units, or a data production indicator value indicative of a number of producing data producer units pushing data values of said data attributes currently used by said applications on all demanding data consumer units.

8. The computer-implemented method of claim 1, further comprising storing said minimal data transformation child adapter in said adapter repository.

9. The computer-implemented method of claim 1, further comprising:
using a trained machine-learning system for the analyzing first specifications and/or the analyzing second specifications, wherein the machine-learning system has been trained with labeled data qualified to train a machine-learning-model of the machine-learning system for a recognition of data exchange parameters.

10. A dynamic data adapter generator system for creating a data transformation adapter for non-standardized data between a data producer unit and a data consumer unit in a data communication environment, said dynamic data adapter generator system comprising:
one or more processors and a memory operatively coupled to said one or more processor, wherein said memory stores program code portions which, when executed by said one or more processors, enable said one or more processors to:
analyze first specifications related to data used by said data producer unit, and second specifications related to data used by said data consumer unit, wherein said first specifications and said second specifications are different from each other;
match data attributes of said first specifications with data attributes of said second specifications, wherein said matched data attributes have different data formats but relate to the same content;
generate dynamically a plurality of data transformation adapters using said matched data attributes;
select a data transformation adapter from said plurality of data transformation adapters, said data transformation adapter being selected based on verifying that said data transformation adapter correctly transforms said matched data attributes of said first and second specifications such that said transformed matched data attributes are compliant with said first and second specifications; and
generate a minimal data transformation child adapter from said verified data transformation adapter based on current dynamic performance requirements of a data consumer, and data attributes currently used by an application of said data consumer unit.

11. The dynamic data adapter generator system of claim 10, wherein said analyzing said first specifications and said analyzing said second specifications comprises assigning labels to identified data attributes.

12. The dynamic data adapter generator system of claim 10, wherein said one or more processors are further enabled to build a repository of said plurality of data transformation adapters.

13. The dynamic data adapter generator system of claim 10, wherein said
selecting a data transformation adapter out of from said plurality of said data transformation adapters further comprises:
selecting a data transformation adapter out of said plurality of said data transformation adapters;
performing a first transformation of a set of data from a data producer unit being compliant with said first specifications to a data consumer unit being compliant with said second specifications;
preforming a second transformation of said set of data from a data producer unit being compliant with said first specifications to a data consumer unit being compliant with said first specifications; and
upon said first transformation and said second transformation yielding an identical result:
classifying said selected data transformation adapter as said verified data transformation adapter.

14. The dynamic data adapter generator system of claim 13, wherein said on or more processors are further enabled to, upon said first transformation and said second transformation not yielding said identical result:
select another data transformation adapter out of said plurality of data transformation adapters.

15. The dynamic data adapter generator system of claim 10, wherein said generating a minimal data transformation child adapter from said verified data transformation adapter further comprises:
determining continuously whether said minimal data transformation child adapter still complies with said current dynamic performance requirements of said data consumer, and data attributes currently used by said application of said data consumer unit; and
upon a negative outcome said continuous determination:
generating a new minimal data transformation child adapter compliant with said current dynamic performance requirements of said data consumer, and said data attributes currently used by said application of said data consumer unit.

16. The dynamic data adapter generator system of claim 15, wherein said dynamic performance requirements are expressed by a dynamic performance requirement vector which components are indicative of at least one of: a maximal allowed data delay value for said application of said data consumer unit, an infrastructure availability indicator value along a communication path of said data communication environment between said data producer unit and said data consumer unit, a data consumption indicator value indicative of a number of demanding data consumer units requesting data values of said data attributes currently used by said applications on all demanding data consumer units, or a data production indicator value indicative of a number of producing data producer units pushing data values of said data attributes currently used by said applications on all demanding data consumer units.

17. The dynamic data adapter generator system of claim 10, wherein said one or more processors are further enabled to store said minimal data transformation child adapter in said adapter repository.

18. The dynamic data adapter generator system of claim 10, wherein said one or more processors, during the analysis first specifications and the analysis of the second specifications, are further enabled to:
use a trained machine-learning system, wherein the machine-learning system has been trained with labeled data qualified to train a machine-learning-model of the machine-learning system for a recognition of data exchange parameters.

19. A computer program product for creating a data transformation adapter for non-standardized data between a data producer unit and a data consumer unit in a data communication environment, said computer program product comprising a computer readable storage medium having program instructions embodied therewith, said program instructions being executable by one or more computing systems or controllers to cause said one or more computing systems to:
analyze first specifications related to data used by said data producer unit, and second specifications related to data used by said data consumer unit, wherein said first specifications and said second specifications being different from each other;
match data attributes of said first specifications with data attributes of said second specifications, wherein said matched data attributes have different data formats but relate to the same content;
generate dynamically a plurality of data transformation adapters using said matched data attributes;
select a data transformation adapter from the plurality of data transformation adapters, the data transformation adapter being selected based on verifying that said data transformation adapter correctly transforms said matched data attributes of said first and second specifications such that the transformed matched data attributes are compliant with said first and second specifications; and
generate a minimal data transformation child adapter from said verified data transformation adapter based on current dynamic performance requirements of a data consumer, and data attributes currently used by an application of said data consumer unit.

* * * * *